US011691091B2

(12) United States Patent
Comella et al.

(10) Patent No.: US 11,691,091 B2
(45) Date of Patent: Jul. 4, 2023

(54) MIST EXTRACTION SYSTEM

(71) Applicant: HAAS AUTOMATION, INC., Oxnard, CA (US)

(72) Inventors: Andre Alexander Comella, Camarillo, CA (US); Sinhue Contreras, Oxnard, CA (US); Ryan Joseph Valencia, Oxnard, CA (US); Donald Paul Earl, Oxnard, CA (US); William F. Tandrow, Simi Valley, CA (US); Gene F. Haas, Camarillo, CA (US)

(73) Assignee: Haas Automation, Inc., Oxnard, CA (US)

( * ) Notice: Subject to any disclaimer, the term of this patent is extended or adjusted under 35 U.S.C. 154(b) by 110 days.

(21) Appl. No.: 17/327,550

(22) Filed: May 21, 2021

(65) Prior Publication Data

US 2021/0346821 A1   Nov. 11, 2021

Related U.S. Application Data

(63) Continuation of application No. 16/557,633, filed on Aug. 30, 2019, now Pat. No. 11,014,017.

(Continued)

(51) Int. Cl.
*B01D 5/00*    (2006.01)
*B01D 45/12*   (2006.01)
*B23Q 11/10*   (2006.01)

(52) U.S. Cl.
CPC .......... *B01D 5/0072* (2013.01); *B01D 5/009* (2013.01); *B01D 5/0027* (2013.01);

(Continued)

(58) Field of Classification Search
CPC .... B01D 5/0072; B01D 5/009; B01D 5/0027; B01D 5/0081; B01D 45/12; B23Q 11/1046

See application file for complete search history.

(56) References Cited

U.S. PATENT DOCUMENTS 8,419,836 B2    4/2013   Ardizzone

FOREIGN PATENT DOCUMENTS

JP          2010279937 A  * 12/2010

OTHER PUBLICATIONS

Comella, Office Action, U.S. Appl. No. 16/557,633, dated Sep. 22, 2020, 8 pgs.

(Continued)

*Primary Examiner* — Robert A Hopkins
(74) *Attorney, Agent, or Firm* — Morgan, Lewis & Bockius LLP

(57) ABSTRACT

A mist extraction system is provided that includes a plenum box having an inlet configured to be coupled in fluid communication with a machine tool enclosure. A blower is coupled in fluid communication with the plenum box and is configured to draw air into the plenum box from the machine tool enclosure via the inlet of the plenum box and exhaust the air back into the machine tool enclosure via an outlet of the blower. A baffle plate is arranged in the plenum box to redirect the air drawn into the plenum box through the inlet of the plenum box and a filter panel is arranged in the plenum box to filter the air redirected by the baffle plate prior to the air entering the blower. A collector arranged to collect mist from the air condensed on the baffle plate and the filter panel.

23 Claims, 6 Drawing Sheets

Related U.S. Application Data

(60) Provisional application No. 62/725,191, filed on Aug. 30, 2018.

(52) U.S. Cl.
CPC ........... *B01D 5/0081* (2013.01); *B01D 45/12* (2013.01); *B23Q 11/1046* (2013.01)

(56) References Cited

OTHER PUBLICATIONS

Comella, Notice of Allowance, U.S. Appl. No. 16/557,633, dated Jan. 22, 2021, 7 pgs.

* cited by examiner

MIST EXTRACTION SYSTEM

CROSS-REFERENCE TO RELATED APPLICATION

The application is a continuation application of U.S. patent application Ser. No. 16/557,633, filed on Aug. 30, 2019, which claims the benefit of U.S. Provisional Application No. 62/725,191 titled "MIST EXTRACTION SYSTEM" and filed on Aug. 30, 2018, the disclosure of each of which is incorporated by reference herein.

TECHNICAL FIELD

The subject disclosure generally relates to machine tools and, more particularly, relates to the extraction of mist generated during cutting operations of computer numerical control (CNC) machine tools.

BACKGROUND OF THE DISCLOSURE

CNC machine tools may utilize cutting tools such as, for example, taps, drills and boring bars, that require lubrication to prevent heat build-up and premature wear. To optimize the efficiency of a CNC machine tool, the amount of lubricant or cutting fluid applied to the cutting tool during operation may be minimized, which may be described as "near dry machining." One approach to near dry machining is to direct misted or atomized lubricant at the cutting tool during operation. However, this approach results in the suspension of lubricant particles in mists in the air surrounding the cutting tool. Similarly, during wet machining in which a liquid coolant is directed at the cutting tool during operation, the liquid coolant may be atomized when hitting the cutting tool at high speeds resulting in the suspension of the liquid coolant in mists in the air surrounding the cutting tool. These mists can be deleterious to machine tool operators' health and may leave an undesirable residue on the workpiece and other surfaces exposed to the mist.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1:
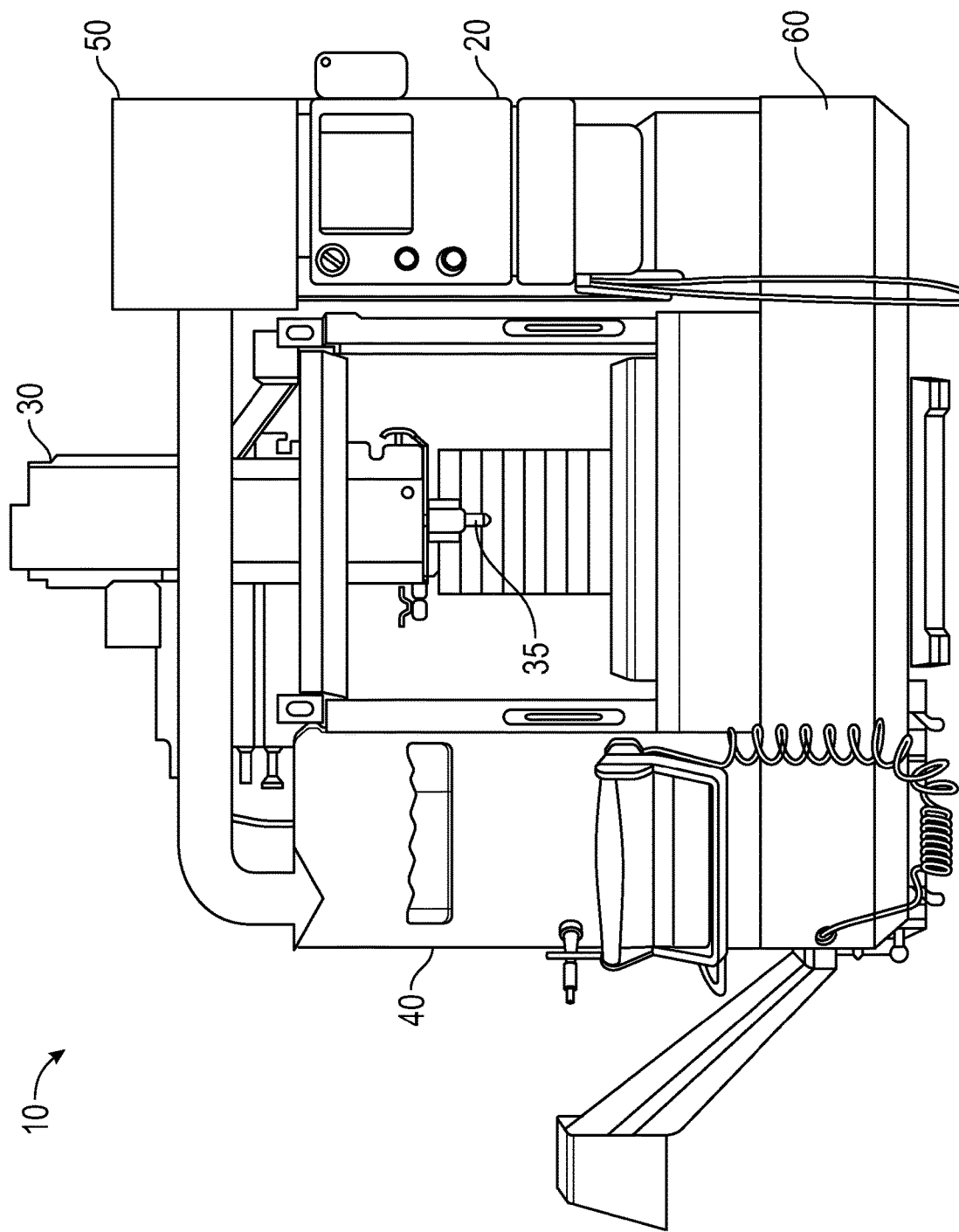
FIG. 1 is a diagram illustrating components of a CNC machine tool according to aspects of the subject technology.

FIG. 1 is a diagram illustrating components of CNC machine tool 10 according to aspects of the subject technology. As illustrated in FIG. 1, machine tool 10 includes control system 20, head unit 30, cutting tool 35, machine tool enclosure 40, mist extraction system 50, and fluid delivery system 60. Machine tool 10 represents one example of a CNC machine tool. The subject technology is not limited to the type of CNC machine tool depicted in FIG. 1 and may be incorporated into other types or configurations of machine tools that may include different combinations and/or arrangements of components.

Control system 20 controls operations performed by components of machine tool 10. Control system 20 may include one or more processors, volatile memory (e.g., random access memory (RAM), static random access memory (SRAM), etc.), non-volatile storage devices (e.g., magnetic media, optical media, flash memory, etc.), a user interface, and a machine interface. The processors may be configured to executes programs or sets of instructions stored in volatile memory and/or the non-volatile storage devices to operate the components of machine tool 10 and perform operations described herein. A machine tool operator may monitor the operation of machine tool 10, select or input sets of instructions for execution, and/or manually control operation of machine tool 10 using the user interface. Control system 20 communications commands and receives feedback information from other components within machine tool 10 via the machine interface.

Head unit 30 may include one or more drive units (e.g., motors, spindles, actuators, etc.) for rotating and/or positioning cutting tool 35 relative to a workpiece situated within machine tool enclosure 40 to remove material from the workpiece according to instructions received from control system 20. In other types of machine tools, such as a lathe, the workpiece may be rotated relative to the cutting tool wherein material is removed from the workpiece by positioning the cutting tool relative to the spinning workpiece according to instructions received from control system 20. Machine tool enclosure 40 provides an enclosed space to operate the cutting tool 35 and remove material from the workpiece and prevent the scattering of debris out of machine tool 10. Machine tool enclosure 40 may include one or more doors to allow a machine tool operator to access the inside of machine tool enclosure 40 to position or remove workpieces, access cutting tool 35, and/or clean the inside of machine tool enclosure 40.

Fluid delivery system 60 is configured to supply a cutting fluid to the point of contact between cutting tool 35 and the workpiece while cutting tool 35 is being driven to remove material from the workpiece. The cutting fluid is directed to the point of contact to both cool and clean cutting tool 35 and the surface of the workpiece. Fluid delivery system 60 may include a storage tank for storing the cutting fluid, one or more pumps for delivering the cutting fluid from the storage tank to the point of contact through one or more nozzles. Fluid delivery system 60 may be configured to collect the cutting fluid accumulated on the floor of machine tool enclosure 40 during operation of machine tool 10 and return the cutting fluid to the storage tank. A filter may be used to remove debris from the accumulated cutting fluid prior to returning the cutting fluid to the storage tank.

A machine tool operator may be exposed to contaminated breathing air when operating machine tool 10. The source of the contaminated air may be the result of the cutting fluid used to lubricate and cool cutting tool 35 while in contact with the workpiece. The collision of cutting tool 35 with the cutting fluid and the workpiece may cause the cutting fluid to heat up and atomize into small droplets called mist. Mist tends to be lighter than air due to its thermal energy and therefore envelopes the interior of machine tool enclosure 40. Upon program completion by machine tool 10, the mist may remain present within machine tool enclosure 40 and when the doors of machine tool enclosure 40 are opened, by the machine tool operator, the mist may loft out of the machine just as the machine tool operator is reaching in to remove the finished workpiece from a work holding fixture or vise and be inhaled by the machine tool operator. In addition to the machine tool operator, the mist may also loft into the breathing air of the entire facility reaching others working within the facility As used herein, the term "mist" refers to liquid droplets suspended in air. The airborne liquid droplets may be 20 microns in diameter or smaller. Different types of cutting fluids may generate different sizes of liquid droplets suspended in the air. For example, water-soluble coolants may create mist droplets in the size range of 2-20 microns. Oil-based coolants may create mist droplets in the size range of 0.5-10 microns. Oil smoke particles may be in the size range of 0.07-1.0 microns. Inhalation of the mist by a machine tool operator or others working around the machine tool may be detrimental to their health.

Figure 2:
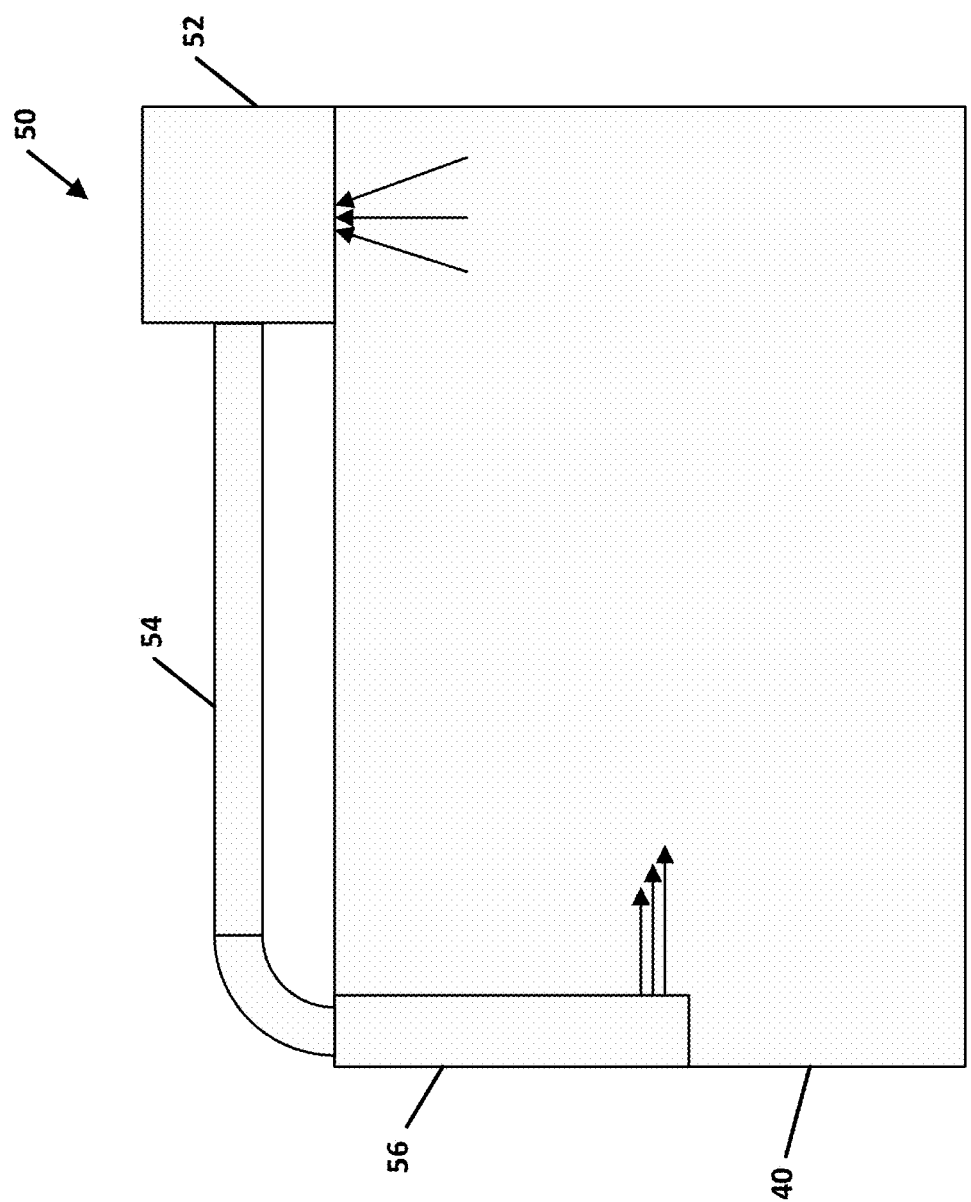
FIG. 2 is a block diagram illustrating a process flow during operation of a mist extraction system according to aspects of the subject technology.

Mist extraction system 50 is configured to remove mist from the air within machine tool enclosure 40 to reduce or remove exposure to the mist by the machine tool operator and others in proximity to machine tool 10. FIG. 2 is a block diagram illustrating the process flow during operation of mist extraction system 50 according to aspects of the subject technology. As depicted in FIG. 2, mist extraction system 50 includes filter assembly 52, exhaust duct 54, and return register 56. The subject technology is not limited to this configuration or numbers of respective components. For example, multiple filter assemblies and/or multiple return registers may be used according to aspects of the subject technology. Briefly, mist-laden air is drawn into filter assembly 52 in which a filtration process is used to remove mist from the air. Following the filtration process, the filtered air is exhausted from filter assembly 52 through exhaust duct 54 and returned to machine tool enclosure 40 via return register 56. While FIGS. 1 and 2 depict components of mist extraction system 50 being arranged outside of machine tool enclosure 40, one or more components may be arranged within machine tool enclosure 40 according to aspects of the subject technology.

Rather than attempting to remove the mist from the air in a single cycle and discharge the filtered air into the work environment like many conventional mist extraction systems, the subject technology recirculates the filtered air back into machine tool enclosure 40 where it reenters the filtration process of mist extraction system 50. This filtration process and recirculation may continue beyond the end of a cutting operation by cutting tool 35 based on control signals from control system 20. Accordingly, even when the cutting operation and therefore mist generation ends, the recirculation and filtration process may continue to further reduce the mist concentration level in the air. The mist concentration level may be detected directly using one or more sensors or inferred from known parameters of the system, such as performance characteristics and run time. Various factors may affect the filtration process and be factored into detecting or inferring the mist concentration levels. For example, the application, size, type, and amount of mist droplets being generated, the internal volume of the machine tool enclosure, the size and number of air gaps in the machine tool enclosure, the area of the door of the machine tool enclosure, an air flow rate of air being extracted from the machine tool enclosure, concentration ratio of the cutting fluid, ambient temperature, humidity, and due point. The filtration process and recirculation may continue to run a predetermined period of time after the end of the cutting operation or until the detected or inferred mist concentration levels have reached a predetermined level. The filtration process performed within filter assembly 52 is described in more detail below.

Figure 3:
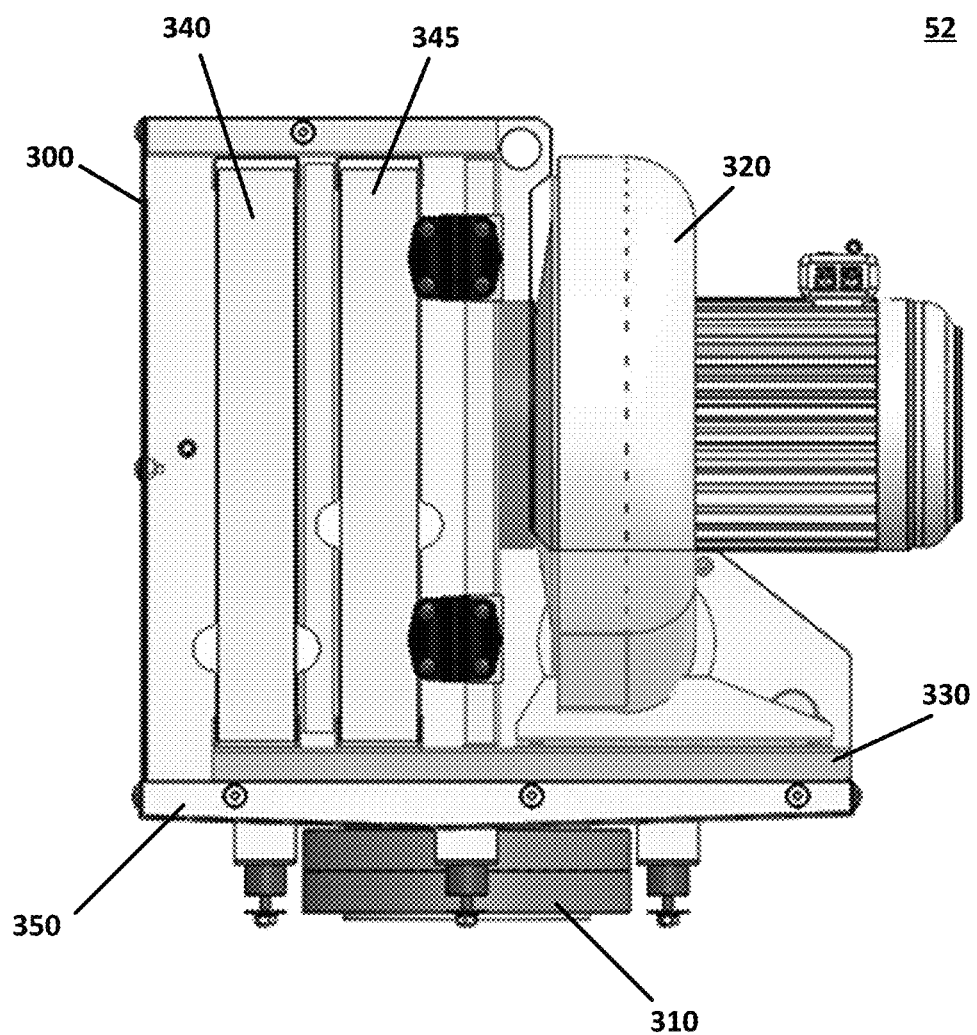
FIG. 3 is a side view of filter assembly 52 with partial transparency to illustrate interior components according to aspects of the subject technology.

FIG. 3 is a side view of filter assembly 52 with partial transparency to illustrate interior components according to aspects of the subject technology. As depicted in FIG. 3, filter assembly 52 includes plenum box 300 having an inlet 310, blower 320, baffle plate 330, filter panels 340 and 345, and collector 350. Filter panels 340 and 345 may be accessible via an access door in the side of plenum box 300 to replace and/or clean the filter panels. The subject technology is not limited to the specific arrangement and numbers of components depicted in FIG. 3. Other similar arrangements and different numbers of respective components may be used to perform the filtration processes described in further detail below with respect to FIGS. 4 and 5.

Figure 4:
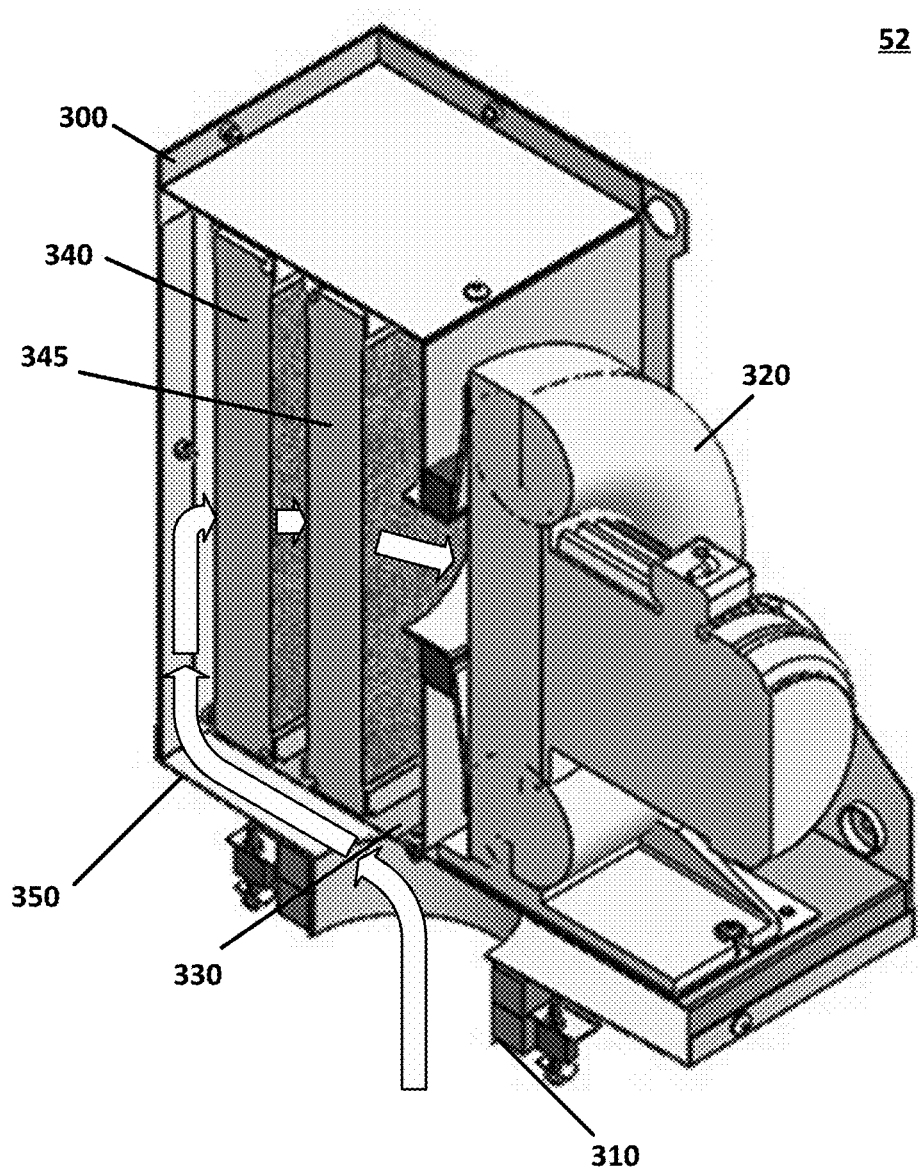
FIG. 4 is a cross-sectioned view of a filter assembly according to aspects of the subject technology.
Figure 5:
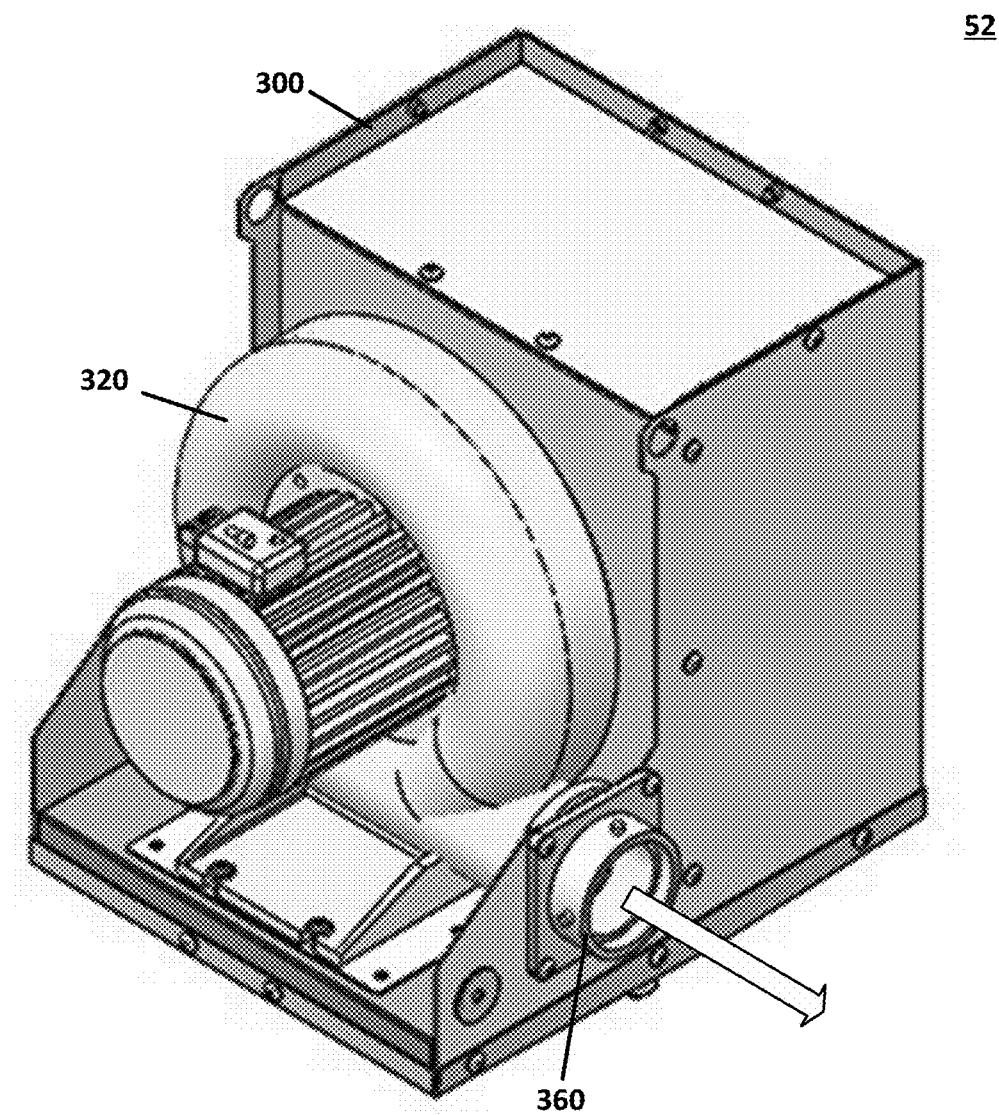
FIG. 5 is a perspective view of a filter assembly according to aspects of the subject technology.

FIG. 4 is a cross-sectioned perspective view of filter assembly 52 according to aspects of the subject technology. FIG. 5 is a perspective view of filter assembly 52 according to aspects of the subject technology. In the example depicted in FIG. 4, one side of plenum box 300 is partially enclosed by collector 350 with inlet 310 creating an opening in collector 350. Inlet 310 is a coupling mechanism configured to couple plenum box 300 to machine tool enclosure 40 to allow fluid communication between plenum box 300 and machine tool enclosure 40. In this manner, mist-laden air may be drawn into plenum box 300 from the inside of machine tool enclosure 40. When mounted on or within machine tool enclosure 40, collector 350 with inlet 310 may be arranged gravitationally below baffle plate 330 and filter panels 340 and 345. In this regard, being gravitationally below another component means that, for example, fluid that condenses or accumulates on a surface of baffle plate 330 or filter panels 340 and 345 will be drawn by gravity to fall into collector 350. Collector 350 may be graded towards inlet 310, through which gravity will cause fluid that has fallen into collector 350 to drain out via inlet 310 into machine tool enclosure 40.

According to aspects of the subject technology, collector 350 may be configured to return the fluid collected in collector 350 to machine tool enclosure 40 or directly into the storage tank of fluid delivery system 60. For example, collector 350 may be graded towards a port formed in collector 350 different from inlet 310. The port may be coupled in fluid communication with fluid delivery system 60 to allow the collected fluid to be filtered and returned to the storage tank.

As further depicted in FIG. 4, plenum box 300 is also coupled in fluid communication with an inlet of blower 320. Blower 320 may be a centrifugal blower, such as a high velocity centrifugal blower. Blower 320 is configured to draw mist laden air into plenum box 300 via inlet 310 and exhaust the air after it passes through the filter panels 340 and 345 within plenum box 300 and out via outlet 350 illustrated in FIG. 5. For example, when an impeller within housing of blower 320 is spun, a vacuum may be created at the inlet to blower 320, which draws air from machine tool enclosure 40 through plenum box 300. Blower 320 may be operated at the start of a cutting operation or after a predetermined period of time following the start of a cutting operation. Blower 320 may be run continuously during the cutting operation or intermittently. When run intermittently, blower 320 may be cycled on and off based on a predetermined interval or based on detected or inferred mist concentration levels within machine tool enclosure 40. Blower 320 may continue to run after the end of a cutting operation to continue the filtration process as described above.

As noted above, blower 320 may be a centrifugal blower. Centrifugal blade blowers may provide higher static pressure performance than other types of blowers or fans, which may improve the flow rate of the mist laden air being drawn into plenum box 300. The size and operating speed of blower 320 may be selected based on the volume of machine tool enclosure 40. For example, mist extraction system 50 may be designed to turn the air inside machine tool enclosure 40 a specified number of turns per minute (e.g., one to four turns per minute). If the volume of machine tool enclosure 40 is between 100 and 400 cubic feet, a ½ hp (375 watt) centrifugal blade blower may be selected for blower 320 to produce flow rates between 100 and 200 CFM.

Outlet 350 may be coupled to exhaust duct 54 shown in FIG. 2 to return the filtered air back into machine tool enclosure 40 via return register 56. The dimensions of exhaust duct 54 may be selected to maintain a flow rate of the air traveling through the duct. If the flow rate is too slow, condensation of any remaining mist droplets may occur on the surface of exhaust duct 54 which may result in stagnant pools of the cutting fluid accumulating within exhaust duct 54. For the example system noted above having a blower producing flow rates between 100 and 200 CFM, the diameter of exhaust duct 54 may range between 3 inches and 8 inches, with better performance having been noted in the range between 4 inches and 5 inches.

The arrows illustrated in FIG. 4 depict an example airflow path of mist-laden air drawn into plenum box 300 by blower 320. As the mist-laden air is drawn in through inlet 310, the mist-laden air collides with and is redirected by baffle plate 330. The mist droplets suspended in the air are heavier than the air and collide with baffle plate 330 as the airflow path is redirected by baffle plate 320. The mist droplets collide and condense or coalesce on the surface of baffle plate 330 and begin to grow in mass. This phenomenon may be referred to as inertia impaction or inertial separation. The droplets attach and collect in mass on baffle plate 330 as well as inlet 310 where eventually gravity forces the droplets to drip downward against the air flow, back into machine tool enclosure 40 and eventually the storage tank of fluid delivery system 60. This collision and collection of droplets on baffle plate 330 represents a first stage of the filtration process.

After being redirected by baffle plate 330 the airflow path of the mist-laden air travels within plenum box 300 and is drawn through filter panels 340 and 345 by blower 320. Filter panels 340 and 345 operate in a similar manner to baffle plate 320. For example, the mist-laden air passes through filter panels 340 and 345 forcing the air to change directions multiple times and the air flows through the media of the filter panel. The mist droplets suspended in the air collide with the filter media and condense or coalesce on the filter media. As the droplets attached and collect in mass on the filter media, gravity forces the droplets to drain downward through filter panels 340 and 345 toward and eventually into collector 350.

The filtering process does not rely on filter panels 340 and 345 to remove all mist droplets from the air in a single pass through the filter media. Accordingly, more coarse filter media may be used for filter panels 340 and 345. For example, the filter media may perform a sieving type of filtration wherein relatively large particles or droplets may be passable through the filter media. In certain aspects of the subject technology, the pore size of the filter media may filter out particle or droplets 10 microns or larger but may allow particles or droplets smaller than 10 microns to pass through the filter media. The subject technology is not limited to pore sizes of this dimension and may use filter media with different pore sizes. While it is possible for droplets smaller than the pore size of the filter media to pass through, some of those droplets will collide with the filter media and condense or coalesce on the filter media rather than passing through. This stripping out of mist droplets by filter panels 340 and 345 represents a second stage of the filtration process.

The more coarse filter media may provide both cost and maintenance advantages over more fine filter media that may be relied upon in other solutions to filter out the droplets in a single pass. The more coarse filter media may be less likely to clog and therefore require less frequent cleaning or replacement. The filter media may be one of several types of filter media including spun metal, polyester, polyethylene, or nano-filtration media specific to the type of cutting fluid being used in the machine tool. In the case of applications dry cutting wood, foam or other dust generating material, the filter panels could be swapped out for paper or fiber filter media. Filter panels 340 and 345 may comprise the same type of filter media or different respective types and sizes of filter media according to aspects of the subject technology. While two filter panels are depicted in FIGS. 3 and 4, the subject technology may be practiced with a single filter panel or with more than two filter panels.

After passing through filter panels 340 and 345, the mist-laden air enters blower 320 and is exhausted out of blower 320 via outlet 360. While in blower 320, the mist-laden air impacts impeller blades and interior surfaces of the housing of blower 320. Similar to baffle plate 330 and filter panels 340 and 345, droplets remaining in the air may coalesce, collect and drain from those surfaces through a drain port in the housing of blower 320 and into collector 350. The removal of mist droplets within blower 320 represents a third stage of the filtration process.

As discussed above with respect to FIG. 2, the air filtered by filter assembly 52 is exhausted back into machine tool enclosure 40 via exhaust duct 54 and return register 56. The filtered air may contain additional mist droplets that may be stripped out after another pass through filter assembly 52. As depicted in FIG. 2, filter assembly 52 is coupled to machine tool enclosure 40 near a first end of the enclosure while return register 56 is arranged to discharge the filtered air at a second end of the enclosure opposite the first end. As in the depicted example, inlet 310 of filter assembly 52 and return register 56 are coupled to different sides of machine tool enclosure 40 and arranged on the respective sides at opposite ends of machine tool enclosure 40. Return register 56 may be arranged inside of machine tool enclosure 40, as depicted, or outside of machine tool enclosure 40 with an opening into machine tool enclosure 40 to allow the return of the filtered air.

Figure 6A:
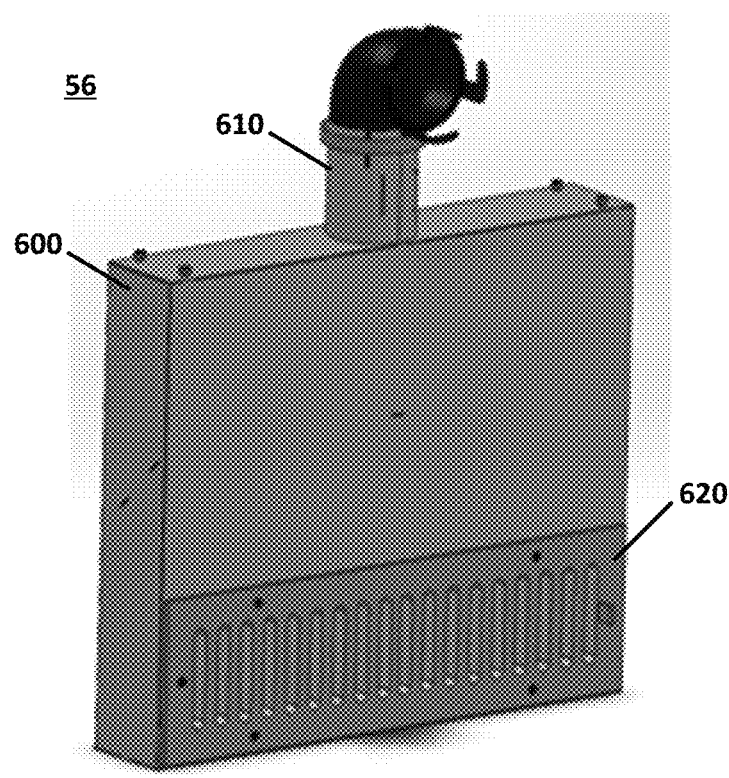
FIGS. 6A and 6B illustrate a return register according to aspects of the subject technology.
Figure 6B:
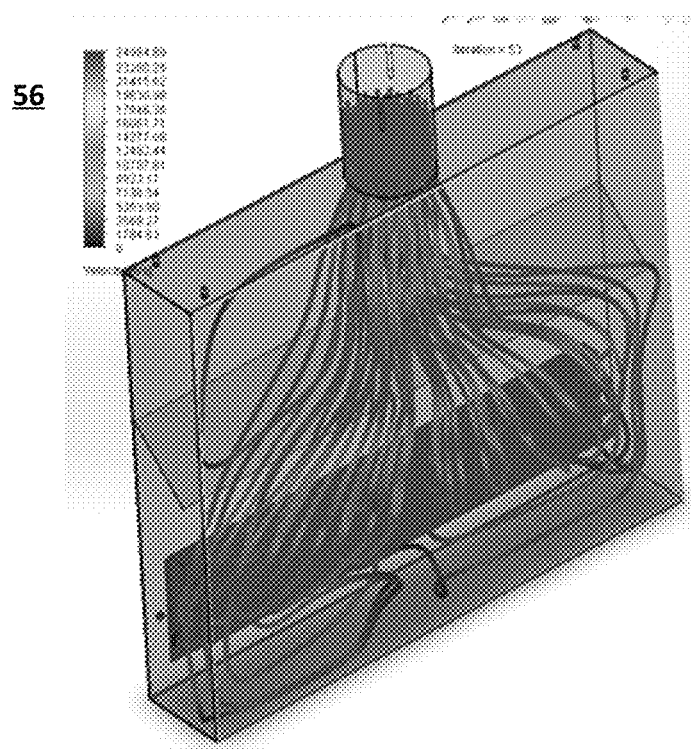

FIGS. 6A and 6B depict return register 56 according to aspects of the subject technology. As depicted, return register 56 includes a register body 600, an intake port 610, and an outlet register 620. Intake port 610 may be coupled to exhaust duct 54 to receive the filtered air exhausted from filter assembly 52. A breather may be incorporated into intake port 610 to allow some of the filtered air exhausted by filter assembly 52 to escape. The filtered air may be pressurized by blower 320 and without the breather allowing some of that filtered air to escape, the pressurized filtered air may cause mist-laden air to be pushed out of machine tool enclosure 40 through cracks or other small openings in the enclosure. The escape of the mist-laden air may expose people in proximity to machine tool 10 to the harmful mist and may result in cutting fluid collecting and weeping down the sides of machine tool enclosure 40.

As illustrated in FIG. 6B, the interior of register body 600 and outlet register 620 may be configured to diffuse the filtered air prior to returning the air to machine tool enclosure 40. The diffused air may create a column of air that moves across machine tool enclosure 40 from the end where return register 56 is coupled to machine tool enclosure 40 to the end where filter assembly 52 is coupled to machine tool enclosure 40. This column of air may push mist-laden air in its path towards inlet 310 of filter assembly 52 to be drawn into filter assembly 52 for filtration. The recirculation of the filtered air that may reenter filter assembly 52 along with new mist-laden air represents a fourth stage of the filtration process.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A mist extraction system, comprising:
    a plenum box comprising an inlet configured to be coupled in fluid communication with a machine tool enclosure;
    a blower coupled in fluid communication with the plenum box and configured to draw air into the plenum box from the machine tool enclosure via the inlet of the plenum box;
    a baffle plate arranged in the plenum box to redirect the air drawn into the plenum box;
    a filter panel arranged in the plenum box to filter the air redirected by the baffle plate prior to the air entering the blower, wherein the filter panel comprises a sieving filter; and
    a collector arranged to collect mist from the air condensed on the baffle plate and the filter panel.

2. The mist extraction system of claim 1, wherein the blower is a centrifugal blower.

3. The mist extraction system of claim 2, wherein the collector is further configured to collect mist from the air condensed on a housing of the centrifugal blower.

4. The mist extraction system of claim 1, wherein the baffle plate is arranged perpendicular to a flow path of the air from the inlet of the plenum box.

5. The mist extraction system of claim 1, wherein the filter panel has a pore size of at least 10 microns.

6. The mist extraction system of claim 1, wherein the filter panel comprises spun metal.

7. The mist extraction system of claim 1, wherein the mist extraction system comprises a plurality of filter panels arrange serially in a flow path of the air between the inlet of the plenum box and the blower.

8. The mist extraction system of claim 1, wherein the collector comprises a pan arranged gravitationally below the baffle plate and the filter panel.

9. The mist extraction system of claim 8, wherein the inlet of the plenum box is arranged in the pan and the pan is graded towards the inlet to return condensed mist to the machine tool enclosure.

10. The mist extraction system of claim 1, wherein the inlet of the plenum box is gravitationally below the baffle plate and the filter panel.

11. A machine tool, comprising:
    a machine tool enclosure;
    a fluid delivery system configured to deliver cutting fluid within the machine tool enclosure; and
    a mist extraction system positioned gravitationally above the machine tool enclosure, the mist extraction system comprising:
        a plenum box comprising an inlet coupled in fluid communication with the machine tool enclosure;
        a blower coupled in fluid communication with the plenum box and configured to draw air into the plenum box from the machine tool enclosure via the inlet of the plenum box and exhaust the air into an exhaust duct;
        a baffle plate arranged in the plenum box to redirect the air drawn into the plenum box;
        a filter panel arranged in the plenum box to filter the air redirected by the baffle plate prior to the air entering the blower, wherein the filter panel comprises a sieving filter; and
        a collector arranged to collect mist from the air condensed on the baffle plate and the filter panel.

12. The machine tool of claim 11, further comprising a cutting tool within the machine tool enclosure.

13. The machine tool of claim 11, wherein the blower is a centrifugal blower.

14. The machine tool of claim 13, wherein the collector is further configured to collect mist from the air condensed on a housing of the centrifugal blower.

15. The machine tool of claim 11, wherein the baffle plate is arranged perpendicular to a flow path of the air from the inlet of the plenum box.

16. The machine tool of claim 11, wherein the filter panel comprises a pore size of at least 10 microns.

17. The machine tool of claim 11, wherein the filter panel comprises spun metal.

18. The machine tool of claim 11, wherein the mist extraction system comprises a plurality of filter panels arrange serially in a flow path of the air between the inlet of the plenum box and the blower.

19. The machine tool of claim 11, wherein the collector comprises a pan arranged gravitationally below the baffle plate and the filter panel, and wherein the inlet of the plenum box is arranged in the pan and the pan is graded towards the inlet to return the mist to the machine tool enclosure.

20. A machine tool, comprising:
    a machine tool enclosure;
    a cutting tool within the machine tool enclosure;
    a fluid delivery system configured to deliver cutting fluid within the machine tool enclosure during operation of the cutting tool;
    a mist extraction system comprising:
        a plenum box comprising an inlet coupled in fluid communication with the machine tool enclosure at a first end of the machine tool enclosure;
        a blower coupled in fluid communication with the plenum box and configured to draw air into the plenum box from the machine tool enclosure via the inlet of the plenum box and exhaust the air into an exhaust duct;
        a baffle plate arranged in the plenum box to redirect the air drawn into the plenum box;
        a filter panel arranged in the plenum box to filter the air redirected by the baffle plate prior to the air entering the blower; and
        a collector arranged to collect mist from the air condensed on the baffle plate and the filter panel; and
    a return register connected to the exhaust duct and in fluid communication with the machine tool enclosure and configured to exhaust the air from the exhaust duct back into the machine tool enclosure at a second end of the machine tool enclosure, opposite the first end, such that a flow of the air moves across the machine tool enclosure from the second end to the first end.

21. The machine tool of claim 20, wherein the mist extraction system is positioned gravitationally above the machine tool enclosure.

22. A mist extraction system, comprising:
- a plenum box comprising an inlet configured to be coupled in fluid communication with a machine tool enclosure;
- a blower coupled in fluid communication with the plenum box and configured to draw air into the plenum box from the machine tool enclosure via the inlet of the plenum box;
- a baffle plate arranged in the plenum box to redirect the air drawn into the plenum box;
- a filter panel arranged in the plenum box to filter the air redirected by the baffle plate prior to the air entering the blower; and
- a collector arranged to collect mist from the air condensed on the baffle plate and the filter panel, wherein the collector comprises a pan arranged gravitationally below the baffle plate and the filter panel and the inlet of the plenum box is arranged in the pan and the pan is graded towards the inlet to return condensed mist to the machine tool enclosure.

23. A machine tool, comprising:
- a machine tool enclosure;
- a cutting tool within the machine tool enclosure;
- a fluid delivery system configured to deliver cutting fluid within the machine tool enclosure during operation of the cutting tool; and
- a mist extraction system positioned gravitationally above the machine tool enclosure, the mist extraction system comprising:
  - a plenum box comprising an inlet coupled in fluid communication with the machine tool enclosure;
  - a blower coupled in fluid communication with the plenum box and configured to draw air into the plenum box from the machine tool enclosure via the inlet of the plenum box and exhaust the air into an exhaust duct;
  - a baffle plate arranged in the plenum box to redirect the air drawn into the plenum box;
  - a filter panel arranged in the plenum box to filter the air redirected by the baffle plate prior to the air entering the blower; and
  - a collector arranged to collect mist from the air condensed on the baffle plate and the filter panel, wherein the collector comprises a pan arranged gravitationally below the baffle plate and the filter panel, and wherein the inlet of the plenum box is arranged in the pan and the pan is graded towards the inlet to return the mist to the machine tool enclosure.

* * * * *